United States Patent
Nissel

[11] 3,959,431
[45] May 25, 1976

[54] METHOD AND APPARATUS FOR MAKING MULTIPLE-LAYERED SHEETS

[75] Inventor: Frank R. Nissel, Ambler, Pa.

[73] Assignee: Welex, Incorporated, Blue Bell, Pa.

[22] Filed: Dec. 19, 1974

[21] Appl. No.: 534,428

Related U.S. Application Data

[63] Continuation of Ser. No. 287,509, Sept. 8, 1972, abandoned, and a continuation-in-part of Ser. No. 264,387, June 19, 1972, Pat. No. 3,833,704, which is a continuation-in-part of Ser. No. 118,410, Feb. 24, 1971, abandoned.

[52] U.S. Cl. .......................... 264/171; 264/176 R; 264/177 R; 425/133.5
[51] Int. Cl.² .................... B29D 7/04; B29F 3/00
[58] Field of Search ........... 264/171, 176 R, 177 R; 425/131.1, 133.5, 461, 462, 463; 18/12 DS, 13 P

[56] References Cited
UNITED STATES PATENTS

| | | | |
|---|---|---|---|
| 2,900,708 | 8/1959 | Pond | 425/131 |
| 2,985,556 | 5/1961 | Rowland | 264/171 |
| 3,223,761 | 12/1965 | Raley | 264/171 |
| 3,400,190 | 9/1968 | Donald | 264/171 |
| 3,415,920 | 12/1968 | Lee et al. | 425/131 |
| 3,432,588 | 3/1969 | Breidt et al. | 264/171 |
| 3,494,993 | 2/1970 | Breidt et al. | 264/171 |

Primary Examiner—Willard E. Hoag

[57] ABSTRACT

A rod of heat-plastified material is extruded and passed through an adaptor section, during delivery to a sheet extruder. In the adaptor section, another material or substance is fed into the interior of the just-extruded rod, such that, upon the rod subsequently being expanded in one direction, and reduced in thickness in another direction, in a sheet-extruder, a multiple-layered laminate may be provided, in that the substance introduced into the rod may differ from the material of the rod. Variations may be made in the manner of introduction of other material into the rod, in order to obtain various numbers of layers, and desired distributions of introduced material through the rod.

8 Claims, 8 Drawing Figures

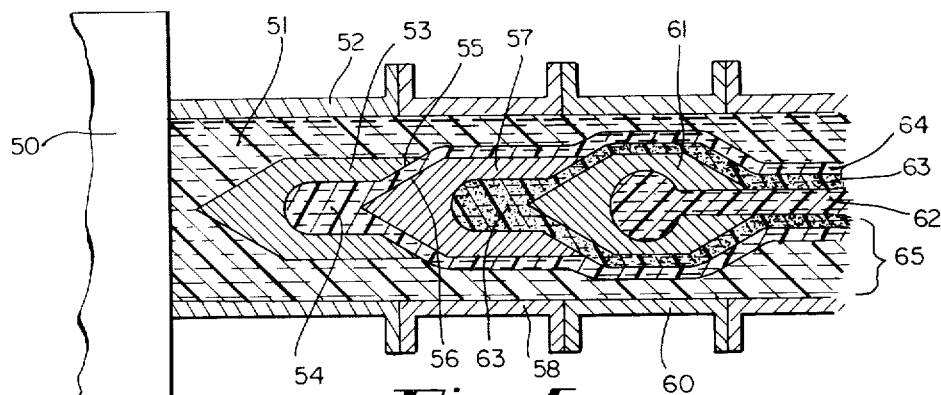
Fig. 5
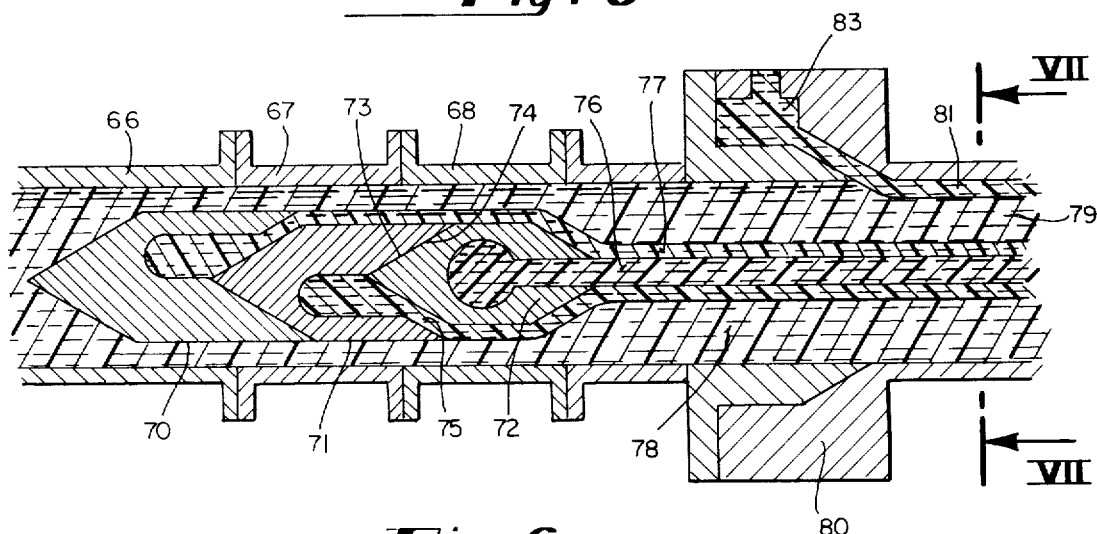
Fig. 6
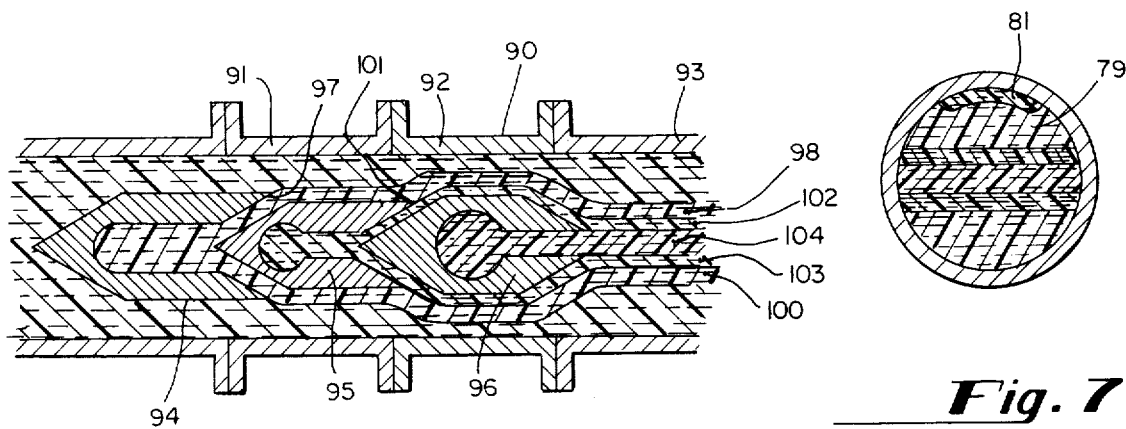
Fig. 8
Fig. 7

METHOD AND APPARATUS FOR MAKING MULTIPLE-LAYERED SHEETS

CROSS-REFERENCE TO RELATED APPLICATION

This is a continuation of application Ser. No. 287,509, filed Sept. 8, 1972 and now abandoned. This is also a continuation in part of co-pending application Ser. No. 264,387, filed June 19, 1972, now U.S. Pat. No. 3,833,704, which in turn is a continuation in part of copending application Ser. No. 118,410, filed Feb. 24, 1971, now abandoned.

BACKGROUND OF THE INVENTION

This invention relates to providing laminated sheets of thermoplastic, or thermoplastic sheets of multi-layered construction.

In the manufacture of various products, it becomes highly desirable to utilize multiple-layered thermoplastic sheets, of laminated construction. For example, there are various articles of manufacture, wherein it becomes highly desirable to utilize layers having different characteristics. Specifically, in the manufacture of plastic cups, it may be desirable to utilize a thermoplastic material having high impact strength, such as butadiene-styrene. However, such a material generally has a dull, matte finish which does not have the attractive appeal associated with other types of thermoplastics, such as crystal polystyrene, which may have a high gloss finish. Accordingly, it may be desirable to utilize one type of material for strength or structural characteristics, and another for its aesthetic characteristics. Even further, it may be desirable to utilize various types of thermoplastics, laminated together, for various applications, with one laminate or layer providing strength in one direction, another providing strength in another direction, and with an intermediate layer perhaps providing bulk, and with outer layers being preselected according to aesthetic characteristics of materials which comprise the outer layers, for example. It will be noted that these instances in terms of product possibilities are merely suggested for purposes of example, it being understood that this invention encompasses the lamination or multi-layer construction of various types of materials, of various numbers of layers, for covering a myriad of uses.

In the past, multiple-layered thermoplastic layers, or laminates have been constructed, but generally such involves the use of a plurality of sheet extruders, for laminating one sheet to another subsequent to the extrusion of each sheet, by using various co-extrusion processes having complex dies and other apparatus. Often, such apparatus is considerably expensive.

THE PRESENT INVENTION

This invention is directed toward providing a method for extruding multiple-layered constructions, or laminates, which does not require duplication of the sheet lamination functions, and which does not require inordinate expenditures for apparatus.

In its specific form, this invention is adapted for modifying existing sheet-extrusion apparatus of the type that first extrudes a thermoplastic rod, and which then feeds the rod into a sheet extruder, whereby its dimensions are reduced in one direction while being elongated into another, in order to effect sheet formation. The present invention is thus addressed, in one respect, to the zone, or path of delivery of the rod between the rod extruder, and the sheet extruder. In accordance with this invention, various modifications to the outlet of the rod extruder, and/or the path of delivery between the rod extruder and the sheet extruder are contemplated, and preferably in the form of providing adaptors in a family, which may be used, either one, or in a series, for introducing various substances intermediate of the rod, for delivery to the sheet extruder as a component of the rod, which, after extrusion in the sheet extruder will result in a multiple-layered construction, or laminate.

Thus, this invention contemplates selectivity with regard to the type and form of the adaptors to be disposed between the rod extruder and sheet extruder, depending upon the particular nature, thickness, placement, and number of layers to be desired in the finally-formed laminate. Also, with the apparatus of the present invention, it is possible to modify existing apparatus quickly, and relatively inexpensively, in order to provide various types of laminates, thereby achieving an element of universality with equipment that has previously been limited generally to specific constructions.

Also, the present invention contemplates the provision of novel overall apparatus, specifically adapted for accommodating the various laminate-selection features of this invention, in being adapted to receive various quantities and types of adaptors, depending upon the particular application desired.

SUMMARY OF THE INVENTION

A laminate is provided by the use of novel method and apparatus, by the adaptation of an extruded thermoplastic rod prior to feeding the rod to a sheet-forming die, by introducing other substances and materials into the rod from laterally of its path of flow between the rod extruder and the sheet-forming die or extruder.

Accordingly, it is a primary object of this invention to provide a novel adaptor for use between a rod extruder and a sheet die or extruder.

It is a further object of this invention to provide a novel method of forming a laminated sheet.

It is another object of this invention to provide a laminated sheet formed in accordance with the method of this invention.

It is another object of this invention to provide a novel apparatus adapted for interchangeability between the point of rod extrusion and the point of entry of the rod into the sheet-forming die, in order to accommodate various pre-selected variations in the final formed laminated sheet.

It is a further object of this invention to provide novel apparatus and techniques for introducing materials and substances into a thermoplastic substance being delivered to a sheet-forming die.

It is another object of this invention to accomplish the above objects, while providing interchangeability of dies.

It is another object of this invention to provide a method and apparatus for making multiple-layered thermoplastic constructions, by laterally feeding the substance that is to form one of the layers, into the just-formed rod.

It is another object of this invention to accomplish the objects set forth immediately above, in multiple stages, for the provision of greater numbers of layers in the laminate to be formed.

It is a further object of this invention to provide a novel apparatus and technique for splitting just-introduced substances, about another substance being introduced, in the path of delivery of a thermoplastic rod between the rod extruder and sheet extruder or die.

Other objects and advantages of the present invention will become readily apparent to those skilled in the art by a reading of the following brief descriptions of the drawing figures, detailed descriptions of the preferred embodiments, and the appended claims.

BRIEF DESCRIPTIONS OF THE DRAWINGS

FIG. 5 is a longitudinal sectional view taken through a series of adaptors connected downstream of the rod extrusion die, and wherein the flow of a plurality of different substances into the extruded rod is illustrated, prior to delivery thereof to the sheet-forming die.

FIG. 6 is a longitudinal sectional view, through another arrangement of introduction elements within their adaptors, in conjunction with another apparatus adapted for lamina surface application.

FIG. 7 is a longitudinal sectional view, taken through another conduit or delivery line from the rod extruder, prior to delivery to the sheet-forming die, wherein another arrangement of introducing elements located in the rod flow path is illustrated, all such elements being of the type that are fed by a lateral feed tube.

DETAILED DESCRIPTION OF PREFERRED EMBODIMENTS

Figure 1:
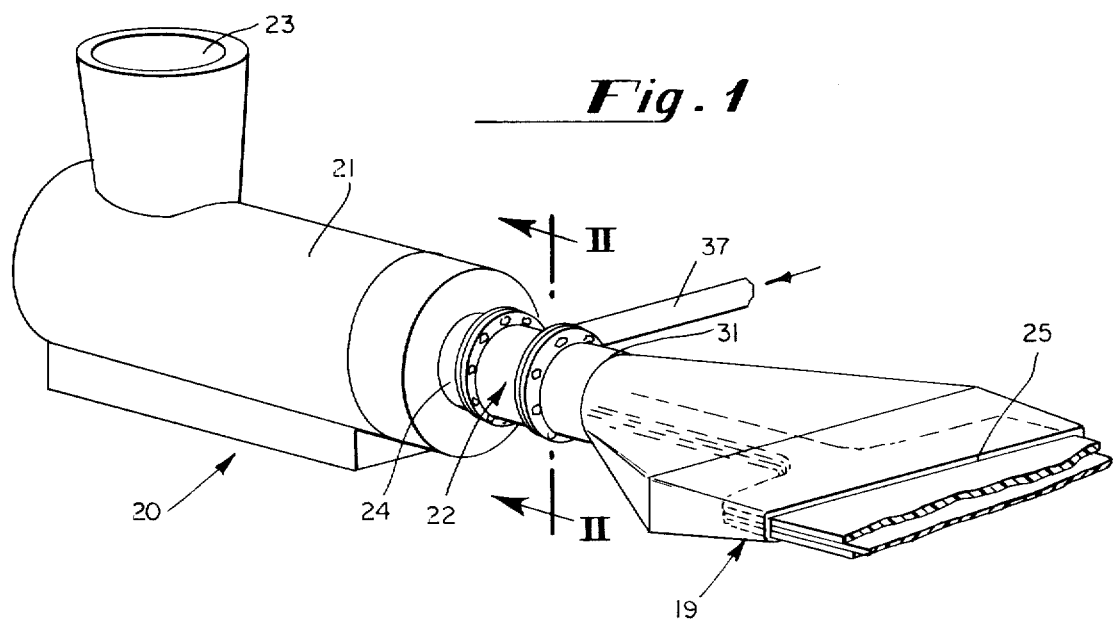
FIG. 1 is a top perspective view of the overall apparatus of this invention, wherein a rod extruder, an adaptor with a lateral feed tube, and a sheet extrusion die are serially illustrated.

Referring now to the drawings in detail, reference is first made to FIG. 1, wherein an apparatus generally designated by the numeral 20 is provided, comprising an extruder 21, an adaptor 22, and a sheet extruder, or sheet-forming die 19 are illustrated serially connected to one another.

The extruder 21 includes an input hopper 23, and a discharge 24, and is adapted to receive materials within the hopper 23, that are subjected to heat, pressure and the like, and which are extruded from the outlet 24 thereof, in heat plastified form, as a rod. It will be understood that as referred to throughout this application, such a rod can take on any of various shapes, depending upon the particular configuration of the discharge orifice 24, or of any subsequent cross-section through which the rod may pass. However, rod-shaped will encompass circular, octagonal, rectangular configurations and the like, of a type wherein any one dimension measured transversely of the rod (in cross-section) does not substantially differ from any other such dimension, irrespective of the particular location for such diametral measurement across the rod. Furthermore, the term "rod-shaped" will encompass all of the above-mentioned configurations, or any of them, but will exclude planar cross-sections, or configurations having a relatively narrow dimension as measured one way across the transverse sectional view, but which have a relatively large dimension as measured at some other point, for example 90° out of phase with the first measurement. Thus, the term rod-shaped is not intended to encompass extrusion orifices sized to discharge sheets such as plastic film and the like.

The rod, as delivered to the sheet extrusion die 19 is still in plastified form, and is subjected to pressures within the die 19 that tend to spread the same, as illustrated in dotted lines in FIG. 1, for example, to be relatively thin in one direction, but relatively large in another direction, in the form of a sheet or the like. In the particular embodiment shown in FIG. 1, a three-layered laminate is being illustrated, discharged from the mouth 25 of the extruder die 19.

Figure 2:
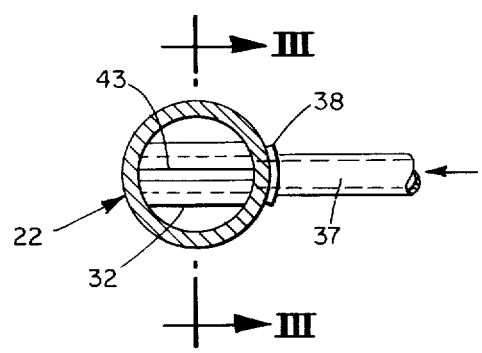
FIG. 2 is a transverse sectional view, taken through the adaptor of FIG. 1, generally along the line II—II of FIG. 1.
Figure 3:
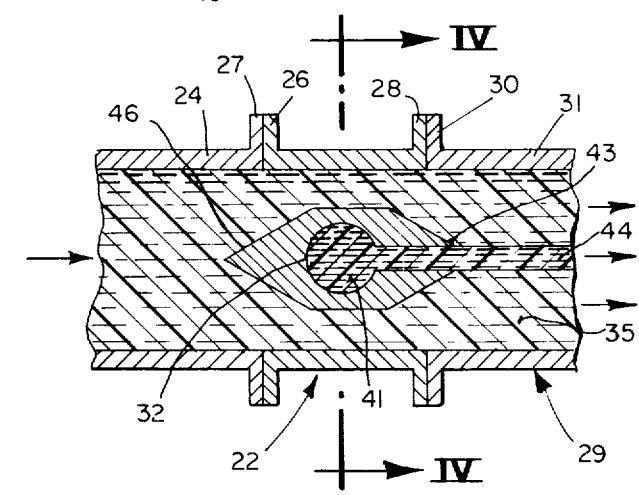
FIG. 3 is a longitudinal sectional view, taken through the adaptor of FIG. 2, generally along the line III—III of FIG. 2, and wherein the flow of a thermoplastic rod through the adaptor, as well as the discharge of another substance into the interior of the rod is illustrated.
Figure 4:
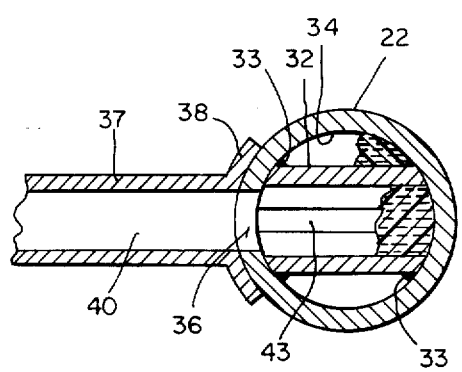
FIG. 4 is a transverse sectional view, taken through the adaptor and introducing element located therein, generally along the line IV—IV of FIG. 3.

With reference to FIGS. 2, 3 and 4, it will be seen that the adaptor 22 is connected to the output 24 of the extrusion die, by any suitable means, such as by the flanges 26 and 27, being bolted or otherwise suitably secured together, and the opposite end of the adaptor 22 is also provided with a flange 28, for connection thereof to another flange 30 of the in-feed of the sheet extrusion die 19. This latter connection is also by conventional bolts or the like (not illustrated). The adaptor 22 is provided with an introducing element 32, disposed therein, welded or otherwise suitably secured as at 33, to the inner surface 34 of the adaptor 22, that provides the path of flow of a heat plastified rod 35 through the adaptor 22. The introducing element 32 is fed through an opening 36, in the side thereof, to which is connected a lateral feed tube 37, by means of a suitable flange or the like 38 bolted or otherwise suitably secured to the side wall of the adaptor 22, as illustrated in FIG. 4. The lateral feed tube 37 has an inlet 40, in communication with a cavity 41 of the introducing means 32, and with the cavity 41 opening into the interior of the rod 35 through a discharge mouth 43, of slotted configuration as illustrated. It will be noted that the mouth 43 opens in a downstream direction, relative to an opposite or upstream direction, the downstream direction being commensurate with the path of flow of the thermoplastic rod material 35, on its delivery from the rod-forming die to the sheet-forming die. It will be noted that the slotted opening of the mouth 43 of the introducing means 32 extends substantially completely across the flow path provided by the interior 34 of the adaptor 22, from one side to the other, as is thus illustrated in FIGS. 2 and 4, such that, upon introduction of a substance into the lateral feed tube, and into the core 35 through the chamber 41 and the mouth 43, such material as it is discharged from the mouth 43 will completely traverse the conduit defined by the inner wall 34, from side to side, without any of the material 35 along the sides of the stream 44, between the stream 44 and adjacent wall portions 34. Thus, the term "extending across the flow path" will be construed in this context. Thus, the stream 44 will comprise a "layer", which may be defined by parallel planar surfaces, but which could also conceivably be defined by non-parallel, or even non-planar curved surfaces. However, the term layer, will not encompass a rod-like configuration.

With reference to FIG. 3, it will be noted that the left-most end of the introducing means 32 has a cross-section, as viewed longitudinally, defined by sloped surfaces that, taken together, comprise an apex 46.

Thus, the apex 46 facilitates the splitting or bifurcation of the path of flow of material 35 comprising the rod, into two sub-paths as such material passes around (above and below as illustrated in FIG. 3) the introducing element 32. It will be noted that it will generally be necessary to introduce the material 44 through the lateral feed tube 37, at a pressure somewhat in excess of the pressure of material within the conduit 29 at the location of the mouth 43, in order to facilitate such in-flow. It will be apparent that this type of introduction will make possible three-layered laminates, or even laminates in which it is desired to have upper and lower layers disposed with an intermediate layer that will facilitate later separation of upper and lower layers of the same material 35, from one another. For example, it may be desirable that the material introduced through the lateral feed tube be of a type that will not specifically adhere to the material 35, thereby enabling the separation of the laminate, if desired, after the sheet-forming operation is completed. In other instances, the material fed through the lateral feed tube may comprise an adhesive, for connecting adjacent layers of the same or different materials together.

Referring now to FIG. 5 in particular, it is seen that the extruder generally designated by the numeral 50, is adapted for discharging the substance 51, from its outlet 52 thereof, in rod form, and with the outlet 52 in this particular instance functioning as an adaptor, and being provided with an introducing element 53, that is suitably mounted within the adaptor 52 in a manner similar to the welded mounting illustrated in FIG. 4, and with the element 53 extending generally completely across the path of flow of the substance 51. The element 53 has a cavity 54 that is fed by means of a lateral feed tube, not specifically illustrated herein, but being generally constructed and arranged relative to the cavity 54 in a manner similar to that illustrated in FIG. 4. It will be noted that the cavity 54 opens into a mouth 55 that is generally of concave configuration, as viewed in an upstream direction, looking back toward the die 50 that discharges the rod 51. Thus, the opening 55 may have sloped inlets, as illustrated, but will generally extend completely across the adaptor 52, and will be adapted to receive therein, the upstream end or apex 56 of another introducing element 57, that itself is carried within an adaptor 58 (generally similar to the mounting illustrated in FIG. 4). The adaptor 58 is connected to another adaptor 60, that also has an introducing element 61, that is constructed generally identical with that illustrated in FIG. 4. It will be clear, with reference to FIG. 5 that a substance 62 is introduced into the rod 51 from the introducing means 61, and that another substance 63 is introduced over the apex of the introducing element 61, and is bifurcated thereby, to flow above and below the same, and into contact on opposite sides of the substance 62. Similarly, a substance 64 is bifurcated to pass above and below the element 57, upon its discharge from the mouth 55 of the introducing element 53, and then to pass above and below the element 57, against the outer surfaces of the layers of substance 63, but inside the substance of the original rod 51, as illustrated by the layered laminate shown at the right end of FIG. 5.

It will be apparent that some of the layers, such as the layer 64 could be a polymer, to which the substance of the rod 51 will adhere, but the substance 62 may be another polymer which will not adhere to the polymer 64, and consequently it may be desirable to utilize the introducing element 57 to apply an adhesive substance 63, that will adhere to the polymer 62, and also to the polymer 64. It will further be apparent that various other arrangements may be possible, and that any number of adaptors may be utilized, consistent with maintaining the composite rod 65 thus formed in a suitable condition for subsequent utilization in a sheet-forming die such as that 19. Thus, any number of adaptors in accordance with this invention may be utilized, to accomplish the desired effect. For example, reference is made to FIG. 6.

In FIG. 6, adaptors 66, 67 and 68 are serially connected as an adaptor zone, downstream of the die which extrudes a heat-plastified rod, with these adaptors containing introducing elements 70, 71 and 72, respectively. It will be noted that the upstream introducing elements 70 and 71 are, in order to accommodate the upstream end of a next-adjacent adaptor, of the concave or open-mouthed type, whereas the downstream-most introducing means 72 has a generally smaller mouth, in that it is adapted to be an end-most one of the introducing means. It will be noted that the adaptor 71 is arranged with a surface 73 in abuttment against a mating surface 74 of the introducing means 72, such that a substance 75 being introduced through the introducing element 71 will pass only below the introducing element 72, into engagement with the undersurface of the substance 76 being introduced by the element 72. Oppositely, a substance 77 is introduced from the element 70, to pass only upwardly over the element 71, over the element 72, to engage the upper surface of the substance 76, and with the rod substance 78 being bifurcated and passing above and below the three elements 70, 71 and 72, to form the five-layered sandwich illustrated at the rightmost end of the element 72 in FIG. 6.

It will also be apparent herein, that while the substances and materials being introduced may be referred to as different substances, this is only to distinguish them from one another, with respect to the locations of their introduction, and it should be understood that even though throughout the specification and claims, a substance such as 76 should be referred to, in a general way, to be different from another substance such as 78 for example, it will be clear that such could also be actually the same materials, separated by different materials. Thus, it may be desired to comprise a five-layered sandwich having polypropylene comprising the substance 78 on the outer-most surfaces, and also as the intermediate-most layer 76, with the substances 75 and 77 comprising completely different chemical constructions.

At the right-most end of FIG. 6, there is illustrated an apparatus 80 adapted for applying an outer surface lamina 81, as illustrated in FIG. 7, to a portion of the periphery of the composite rod 79, downstream of the last introducing element 72. It will, however, be clear that the peripheral lamina 81 may be any substance, material or the like, that is capable of being extruded from a chamber 83, and that such may be introduced at any location, from the location of the extruded die that forms the rod prior to its entering any of the adaptors such as that 66, up to the point of introduction of the composite rod such as 79, to the sheet-forming die. Thus, the apparatus 80 may even be provided in conjunction with any or all of the adaptors 66, 67 and 68 as part of the adaptor zone or even in conjunction with any of the other adaptors disclosed in this application.

The particular details of the apparatus 80 will be similar to that of the adaptors disclosed in detail in the above-mentioned application of which this application is a continuation-in-part, namely application Ser. No. 264,387, Filed June 19, 1972, now U.S. Pat. No. 3,833,704. However, it will be understood that the use of such an adaptor 80, with a laterally fed internal introducing element such as that 72, for example, will permit numerous additional combinations and advantages in making multiple layered articles and laminations. For example, in a short distance of space, it may be desired to utilize an adaptor of the type 80, in conjunction with an adaptor such as that 68, or even to use more than one such adaptor 80, for applying lamina at different upstream-downstream locations along the delivery line between the rod extruder and sheet extruder, or even along opposite sides (diametrially) of the rod, for example, above and below each other in vertical section. Thus, it will be clear that many modifications and numerous possibilities arise from this combination of features. As is shown in FIG. 7, the central layer 76 extends diametrically all the way across the tube 89 in which the coextrusion is taking place. The added layers 75, 77, which sandwich the layer 76, are somewhat shorter than layer 76. Accordingly, as shown, each layer 75 and 77 contacts layer 76 along an area which extends less than half-way around the entire surface of layer 76. Also, the flow portion 79 contacts layer 77 less than half-way around layer 77. Further, the flow portion 78 contacts layer 75 less than half-way around the layer 75. Similarly, the further layer 81 is applied through a limited arc, such that it is applied less than half-way around the material comprising the combined layers 79, 77, 76, 75 and 78.

With reference to FIG. 8, there is illustrated a conduit generally designated by the numeral 90, comprising a plurality of adaptors 91, 92, and 93, with introducing elements 94, 95 and 96, respectively arranged therein, generally similar to the arrangement illustrated in FIG. 5, for bifurcating the flow from the element 94, by the element 95, and for bifurcating the flow from the element 95, by the element 96. However, it will be noted, that by controlling the width of the element 94, for example, at its mouth 97, such that the element 95 is completely within the "shadow" of the mouth 97, the thickness of the layer 98 may be controlled, as well as that of the lower layer 100. Alternatively, by controlling the thickness of the element 95, such that its mouth 101 is not as thick as the element 96, such that the element 96 is not in the shadow of the mouth 101 of the element 95, very thin layers 102 and 103 may be deposited on each side of the layer 104. It will thus be apparent that by having adaptors on hand with different sized introducing elements, and with differently configured mouths, as well as differently sized mouths, as in FIG. 6, myriad and numerous arrangements of laminations may be made.

It will be apparent from all of the foregoing, that the heatplastified material that is used in connection with this invention will encompass any of the materials generally responsive to heat, to become flowable under the application of heat. Furthermore, it will be apparent that while the term "rod" has been defined above to encompass various shapes, such as round, hexagonal and the like, even oval shaped rods may be utilized, by utilizing an outlet for the rod extruder adapted for effecting oval configurations, and by utilizing adaptors downstream of such die that also provide oval crosssectional configurations. In fact, in many instances, oval configurations will be preferable upstream of a sheet-forming die, for facilitating the sheeting process due to having portions of the composite rod that have flattened or substantially flattened sides.

What is claimed is:

1. The method of making a multiple-layer sheet of thermoplastic material comprising:
    a. forming a moving heat-plastified rod-shaped stream of a first thermoplastic substance in an adaptor upstream of a sheet-forming extruder die, said adaptor having a rod-shaped passageway for said stream;
    b. dividing said stream into separate layers at a first location in said adaptor, introducing a second thermoplastic substance as a layer into and across said adaptor downstream of said first location to form a longitudinally disposed internal thermoplastic layer between said separate layers, said first thermoplastic substance being disposed less than half-way around a perimeter of said layer of said second thermoplastic substance;
    c. while maintaining said stream divided, introducing a further layer of thermoplastic substance into the adaptor at a second location downstream from said first location between said layers previously introduced or formed and in such a manner as to provide with said second thermoplastic substance a plurality of different internal layers intermediate said separate layers, each of said separate layers being applied less than half-way around a perimeter of an adjacent said internal layer;
    d. steps (b) and (c) being performed while maintaining a generally rod-shaped configuration for the substances in said adaptor, thereby forming a rod-shaped multilayer stream;
    e. subjecting said rod-shaped multilayer stream to pressure within a transition portion of said die to spread said multilayer stream, and
    f. extruding said multilayer stream as a multilayer sheet through said sheet-forming die.

2. The method of claim 1, wherein the second thermoplastic substance is disposed between the divided portion of the first substance of the rod, with the second substance extending completely across the rod, at a width greater than that of either portion of said first substance.

3. The method of claim 1, wherein said second thermoplastic substance is introduced as two separate layers into the adaptor each against a face of the third thermoplastic substance layer.

4. The method of claim 1, wherein the second substance is introduced into the adaptor adjacent a surface of one portion of the first substance, and wherein the third substance is introduced into the adaptor adjacent a surface of the other portion of the first substance.

5. The method of claim 1, wherein said second substance is applied against a surface of one portion of said divided first substance, wherein said third substance is applied against a surface of another portion of said divided first substance, and wherein a fourth thermoplastic substance is introduced between said second and said third substance.

6. The method of claim 1, wherein a fourth substance is introduced into the adaptor to form at least five internal layers within the rod.

7. The method of claim 1, wherein said third substance is applied over less than one-half of the periphery of the rod, after step (a) and prior to step (e).

8. The method of claim 1, wherein the second substance is introduced laterally into the adaptor.

* * * * *